United States Patent [19]

Var

[11] Patent Number: 5,720,617
[45] Date of Patent: Feb. 24, 1998

[54] EDUCATIONAL TOY

[76] Inventor: Laurie A. Var, 22 Skylark #125, Larkspur, Calif. 94939

[21] Appl. No.: 680,297

[22] Filed: Jul. 12, 1996

[51] Int. Cl.$^6$ ............................................. G09B 19/00
[52] U.S. Cl. ........................ 434/247; 446/75; 446/491; 229/122.2
[58] Field of Search ................. 446/75, 491, 475; 434/247, 258, 260, 367, 259, 236; 273/440, 447, 148 A, 144 A

[56] References Cited

U.S. PATENT DOCUMENTS

| | | | |
|---|---|---|---|
| 2,121,246 | 6/1938 | Gordon | 434/367 |
| 3,484,105 | 12/1969 | Winston | 273/440 |
| 5,186,464 | 2/1993 | Lamle | 273/148 A X |
| 5,333,781 | 8/1994 | Roccaforte | 229/229 |

*Primary Examiner*—Mickey Yu
*Attorney, Agent, or Firm*—Larry D. Johnson

[57] ABSTRACT

An educational toy provides a dispenser box member having an aperture or other opening it its top surface, and containing a plurality of discrete flexible fabric sheet elements. An infant is encouraged to pull one sheet element out of the dispenser box at a time, and after all the sheet elements have been removed, either the infant or an adult can reinsert the sheet elements into the dispenser box member for repeated play.

6 Claims, 6 Drawing Sheets

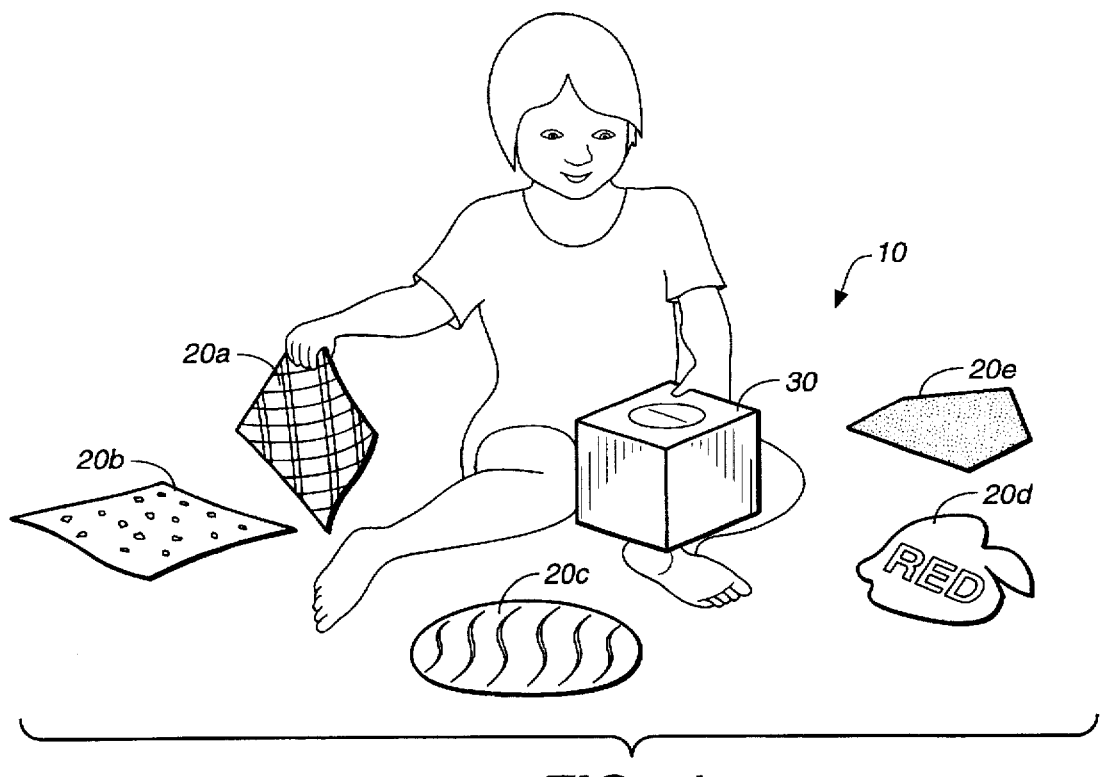
FIG._1

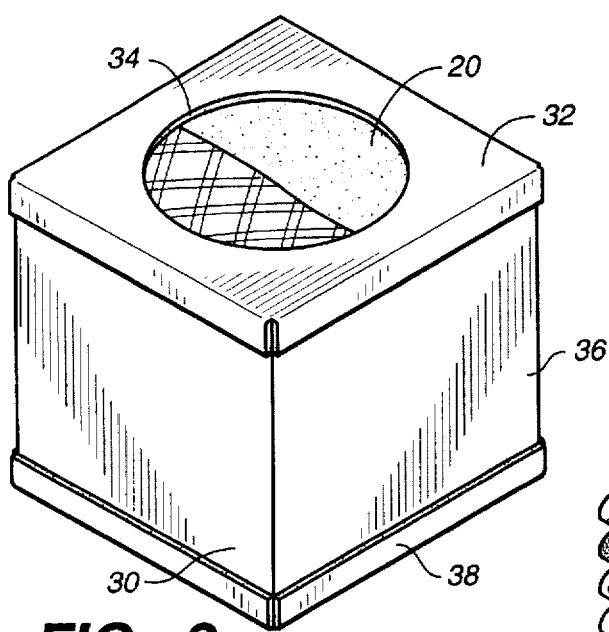
FIG._2
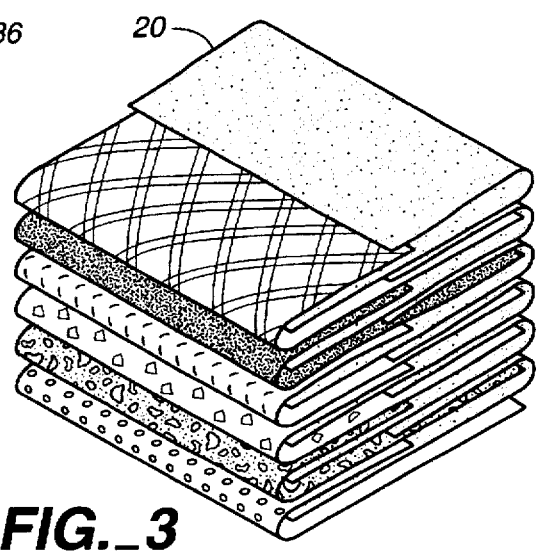
FIG._3

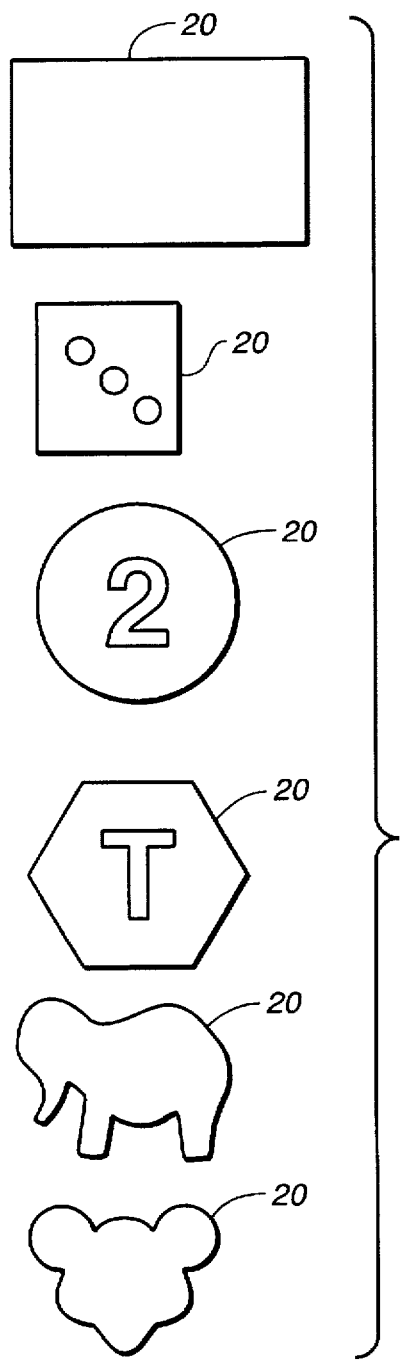
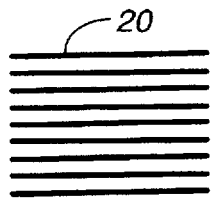
FIG._4A
FIG._4B
FIG._5

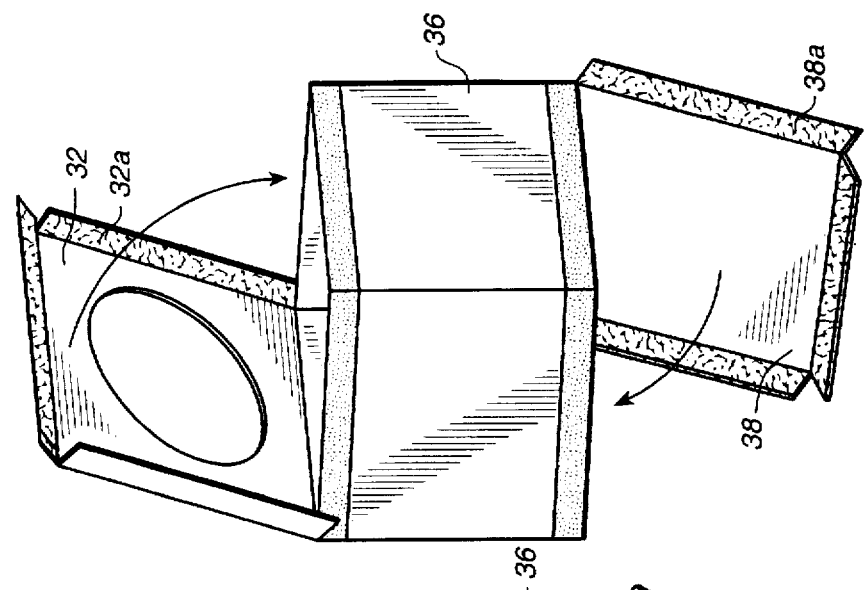
FIG._6C
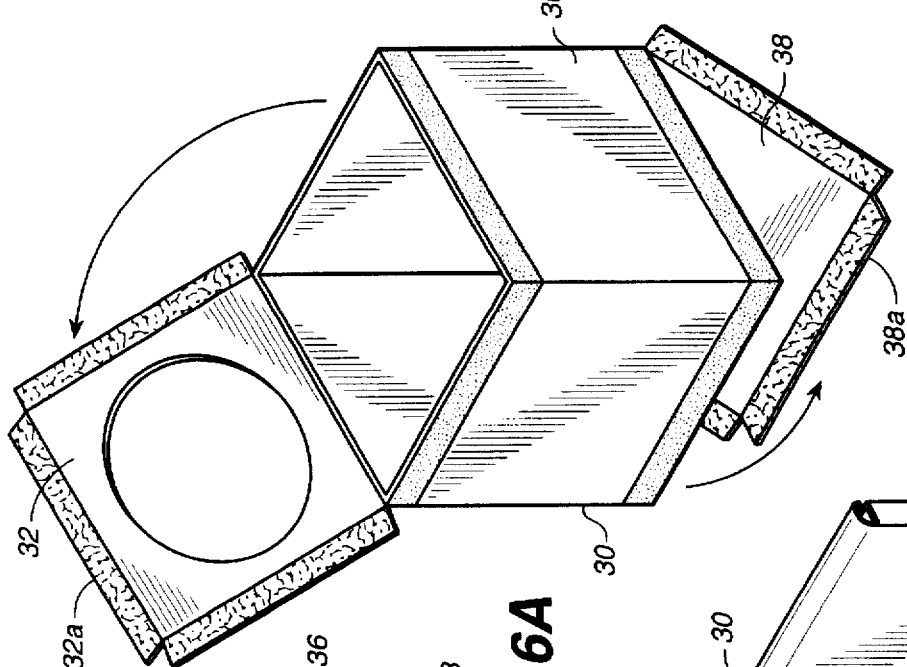
FIG._6B
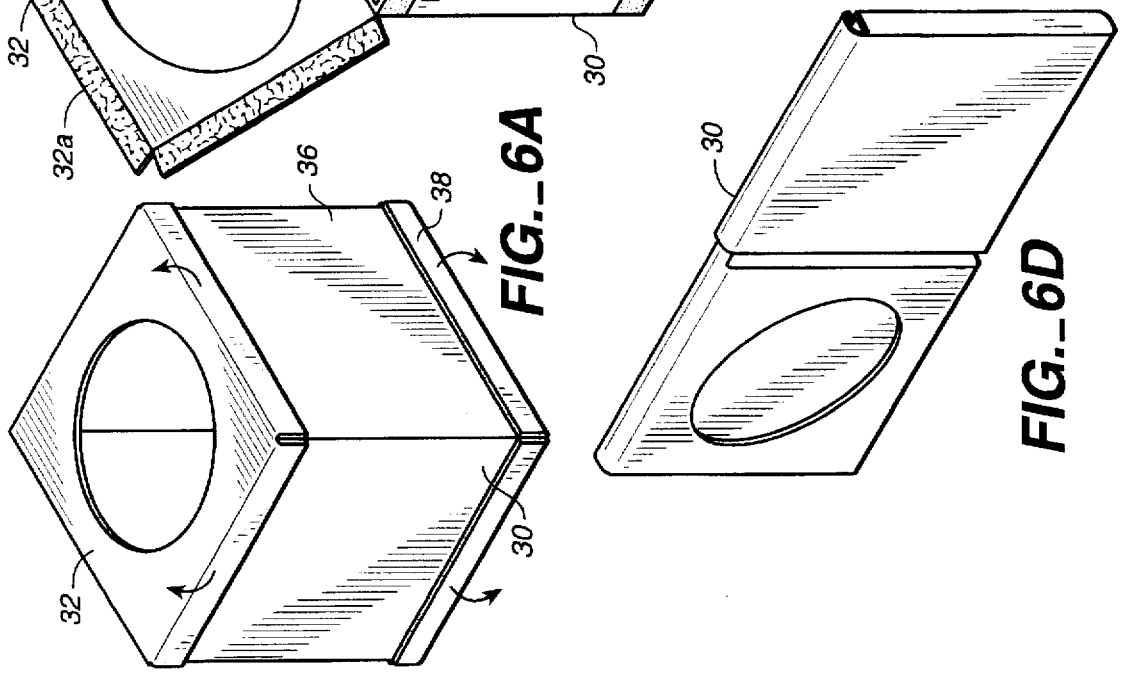
FIG._6A
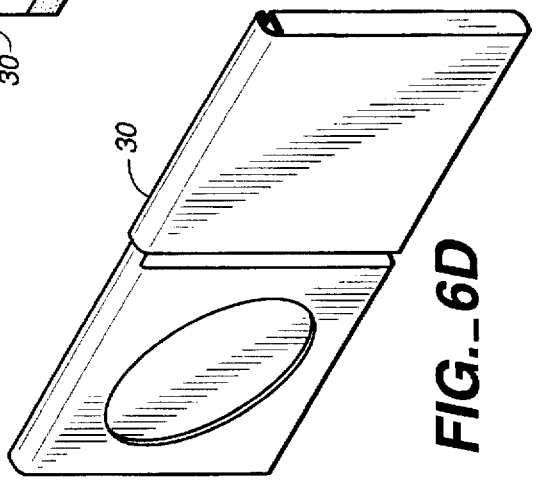
FIG._6D

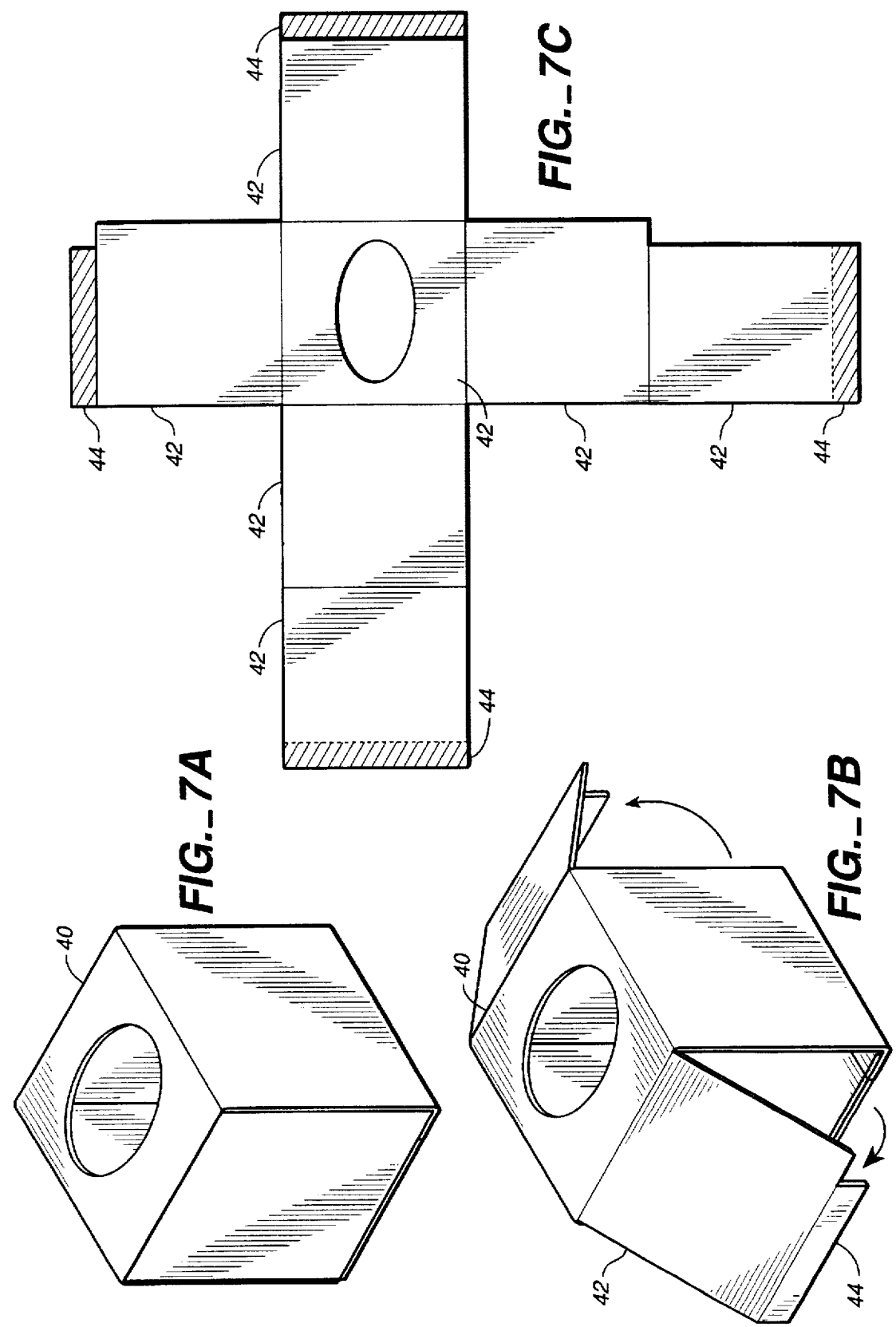

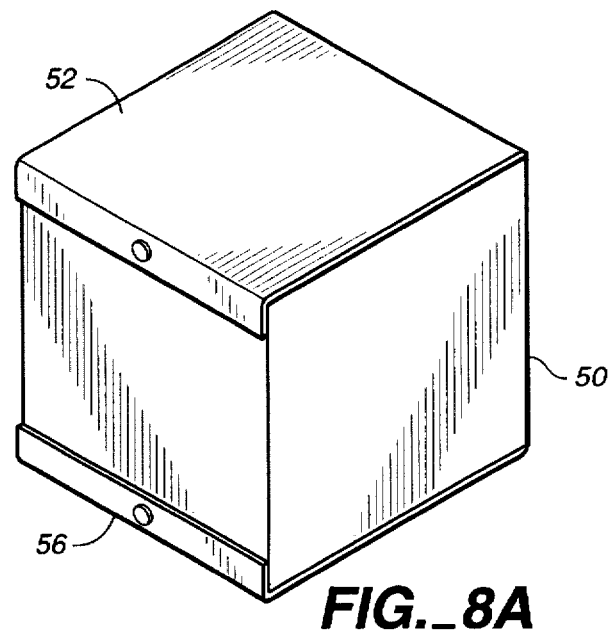
FIG._8A
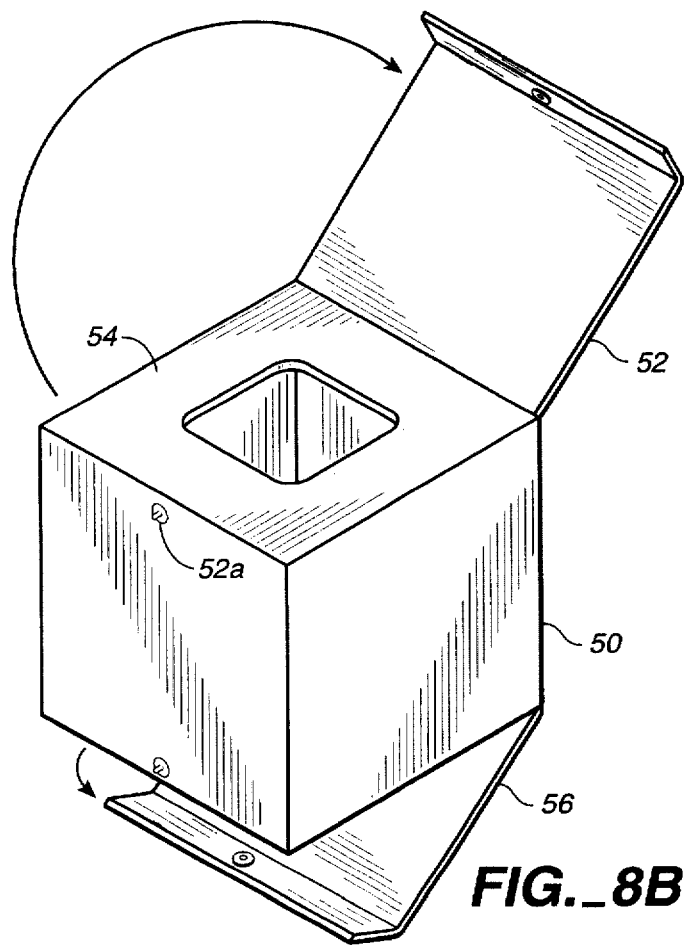
FIG._8B

EDUCATIONAL TOY

BACKGROUND OF THE INVENTION

1. Field of the Invention

This invention relates generally to toys and playthings, and more specifically to an improved educational toy enabling an infant to improve his or her motor skills and simultaneously learn colors, numbers or other identifying features by sequentially removing flexible fabric sheets from a dispenser box.

2. Description of the Prior Art

Toys and playthings for infants are of course well known and in widespread use. However, few known toys provide a safe way to improve an infant's motor skills, while simultaneously teaching the infant to differentiate colors, numbers or other identifying features.

SUMMARY OF THE INVENTION

The educational toy of this invention provides an apparatus enabling an infant to improve motor skills while teaching the infant to identify distinguishing features. The inventive apparatus includes a dispenser box member having an aperture or other opening it its top surface, and containing a plurality of discrete flexible fabric sheet elements. An infant is encouraged to pull one sheet element out of the dispenser box at a time, and after all the sheet elements have been removed, either the infant or an adult can reinsert the sheet elements into the dispenser box member for repeated play.

BRIEF DESCRIPTION OF THE DRAWINGS

FIG. 1 is a perspective view of an educational toy of this invention in use, with an infant having removed a plurality of single, discrete flexible fabric sheet elements from a dispenser box member;

FIG. 2 is a perspective view of the educational toy of this invention illustrating the plurality of fabric sheet elements inserted within the dispenser box member;

FIG. 3 is a perspective view of the plurality of interleaved fabric sheet elements as they might be organized for insertion into the dispenser box member;

FIG. 4A is a side elevation view of a plurality of stacked, non-interleaved fabric sheet elements as they might be organized for insertion into the dispenser box member;

FIG. 4B is a side elevation view of a plurality of folded, non-interleaved fabric sheet elements as they might be organized for insertion into the dispenser box member;

FIG. 5 is a plan view of a plurality of typical sheet elements indicating differentiation of the sheets by variable indicia, shape or size;

FIGS. 6A–6D are a series of perspective views of a dispenser box of this invention, illustrating one embodiment of an opening top panel and bottom panel, and a collapsible construction enabled by sealable and unsealable top and bottom panel edges;

FIGS. 7A–7C are a series of perspective views of an alternative collapsible construction for the dispenser box member enabled by interlocking panel edges; and FIGS. 8A–8B are perspective views of a further alternate embodiment of a dispenser box member of this invention, illustrating a sealable closure for the top and bottom panels.

DETAILED DESCRIPTION OF A PREFERRED EMBODIMENT

FIG. 1 is a perspective view of the educational toy 10 of this invention in use with an infant having removed a plurality of flexible fabric sheet elements 20a, 20b, 20c, 20d, 20e from the dispenser box member 30. After all of the individual sheet elements 20 have been removed from the dispenser box by the infant, either the infant or an adult can reorganize and reinsert the sheet elements back into the dispenser box as described infra.

The dispenser box member 30 can be made of plastic, durable cardboard, or other suitable material, preferably in a cube or box-like configuration in the manner of a well-known tissue dispenser box. The dispenser box may incorporate rounded (e.g., radiused) edges and/or corners to help reduce the risk of injury to the infant. Alternatively, the edges and/or corners may be padded or otherwise insulated to achieve this goal. The dispenser box member may be of any appropriate dimensions, for example, a four and-a-half to five inch cube with a round or oval aperture in its top surface.

FIG. 2 is a perspective view of the dispenser box 30 illustrating its configuration as a generally cube-like structure having a top panel 32 bearing an aperture or other opening 34, a plurality of side walls 36, and a bottom panel 38. A plurality of fabric sheet elements 20 are contained within the dispenser box 30 and manually accessible through aperture 34.

FIG. 3 is a perspective view of a plurality of interleaved fabric sheet elements 20 as they might preferably be organized for insertion into the dispenser box member. Such interleaving is well known in the art, and enables serial access to the individual sheet elements.

FIG. 4a is a side elevation view of a plurality of sheet elements 20 that have been simply stacked, while FIG. 4b is a side elevation view of the sheet elements 20 having been folded and stacked. The sheet elements 20 may be inserted into the dispenser box in these organizations, or in any other organization, or even in completely disorganized and random fashion.

FIG. 5 is a plan view of a variety of typical sheet elements 20 illustrating differentiation of the various sheets. The individual sheet elements may be of any appropriate size and shape. In the preferred embodiment, the individual sheets may consist of identically-size square or rectangular sheets, approximately eight to nine inches square, enabling the desirable stacking and interleaving of the sheets. The individual sheets themselves may be made of any suitable material such as soft but durable fabric. As described, the individual sheets may also preferably bear individual identifying indicia such as color, numbers, letters or other features, or maybe uniquely shaped in geometric patterns or recognizable shapes.

FIGS. 6a–6d are a series of perspective views of one embodiment of the dispenser box of this invention. FIG. 6a illustrates a dispenser box 30 in its operating configuration. FIG. 6b illustrates the box 30 with the top panel 32 and bottom panel 38 having been partially released from attachment to the side panels 36 of the box by releasable edges 32a, 38a. This releasable feature may be accomplished by any of well-known means such as hook and loop fastener, adhesive, or other mechanism. FIG. 6c illustrates the side panels 36 being collapsed together, and the top panel 32 and bottom panel 38 being brought into juxtaposition with the side panels, yielding the fully collapsed configuration illustrated in FIG. 6d. This collapsible nature may be desirable for ease in storage and transportation of the dispenser box.

FIGS. 7a–7c are a series of perspective views of an alternative collapsible construction for the dispenser box member. This box 40 incorporates a plurality of hinged panels 42 defining the top, bottom and side panels of the box, with interlocking edges 44 enabling box breakdown and construction. Such construction is well known in the art.

FIGS. 8a and 8b are views of a further alternative embodiment of a dispenser box member of this invention. Box 50 includes a sealable flap 52 which may cover and lock over top panel 54 by a snap or other closure 52a when the dispenser apparatus is not in use. Similarly, hinged bottom panel 56 enables access to and refilling of the internal cavity of the dispenser box for repeated play. Each of these panels may be hinged (as illustrated) or completely removable.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An educational toy comprising:
   a box member having a top, side and bottom portions, said top portion including an aperture; and
   a plurality of discrete flexible sheet elements adapted for insertion into said box member, and further interleaved for sequential dispensing through said top portion aperture, said sheet elements each bearing a unique and specifically designed differentiating feature.

2. The educational toy of claim 1 wherein said box member portion is openable enabling refilling of said box member with said plurality of sheet elements.

3. The educational toy of claim 1 wherein said box member top portion includes releasable edges.

4. The educational toy of claim 1 wherein said box member top portion includes a sealable cover over said aperture.

5. The educational toy of claim 1 wherein said box member is collapsible.

6. The educational toy of claim 1 wherein said sheet element differentiating feature comprises indicia.

* * * * *